US012025173B2

(12) United States Patent
Volborth

(10) Patent No.: US 12,025,173 B2
(45) Date of Patent: Jul. 2, 2024

(54) CORROSION-RESISTANT SCREW-SECURING DISC

(71) Applicant: SLI Assets GmbH & Co. KG, Plettenberg (DE)

(72) Inventor: Thomas Volborth, Halver (DE)

(73) Assignee: SLI Assets GmbH & Co. KG, Plettenberg (DE)

( * ) Notice: Subject to any disclaimer, the term of this patent is extended or adjusted under 35 U.S.C. 154(b) by 261 days.

(21) Appl. No.: 17/616,732

(22) PCT Filed: Feb. 26, 2021

(86) PCT No.: PCT/EP2021/054845
§ 371 (c)(1),
(2) Date: Dec. 6, 2021

(87) PCT Pub. No.: WO2021/190857
PCT Pub. Date: Sep. 30, 2021

(65) Prior Publication Data
US 2022/0325744 A1    Oct. 13, 2022

(30) Foreign Application Priority Data
Mar. 26, 2020 (EP) ..................................... 20165955

(51) Int. Cl.
*F16B 43/00*    (2006.01)
(52) U.S. Cl.
CPC .................................. *F16B 43/00* (2013.01)
(58) Field of Classification Search
CPC .......... F16B 35/06; F16B 39/10; F16B 39/24; F16B 43/00; F16B 43/002

USPC ...................... 411/337, 371.2, 531, 534, 538
See application file for complete search history.

(56) References Cited

U.S. PATENT DOCUMENTS

| 605,788 A   | * | 6/1898 | Johnson .................. F16B 39/24 411/958 |
| 3,332,464 A | * | 7/1967 | Castel ..................... F16B 39/24 411/164 |
| 3,495,907 A | * | 2/1970 | Rogers .................... G01L 1/241 73/761 |
| 3,752,203 A | * | 8/1973 | Hill, Jr. ................. F16B 39/282 411/959 |
| 4,103,725 A |   | 8/1978 | Abe |

(Continued)

FOREIGN PATENT DOCUMENTS

DE    20 2009 011 269 U1    11/2009
EP        0 470 433 A1         2/1992
(Continued)

OTHER PUBLICATIONS

DIN EN 10027-2:2015-07, Designation systems for steels—Part 2: Numerical system, dated Jul. 2015.
(Continued)

*Primary Examiner* — Roberta S Delisle
(74) *Attorney, Agent, or Firm* — Collard & Roe, P.C.

(57) ABSTRACT

A corrosion-resistant screw-securing disc has an annular, stainless steel disc body for arrangement between a screw head and a flat support, with a disc upper side and a disc underside. The surfaces of the disc upper side and of the disc underside of the disc body are compacted by a stamping process, wherein the disc body has a material thickness of at least 1.5 mm and has a convex shape.

13 Claims, 2 Drawing Sheets

(56) References Cited

U.S. PATENT DOCUMENTS

Figure 1:
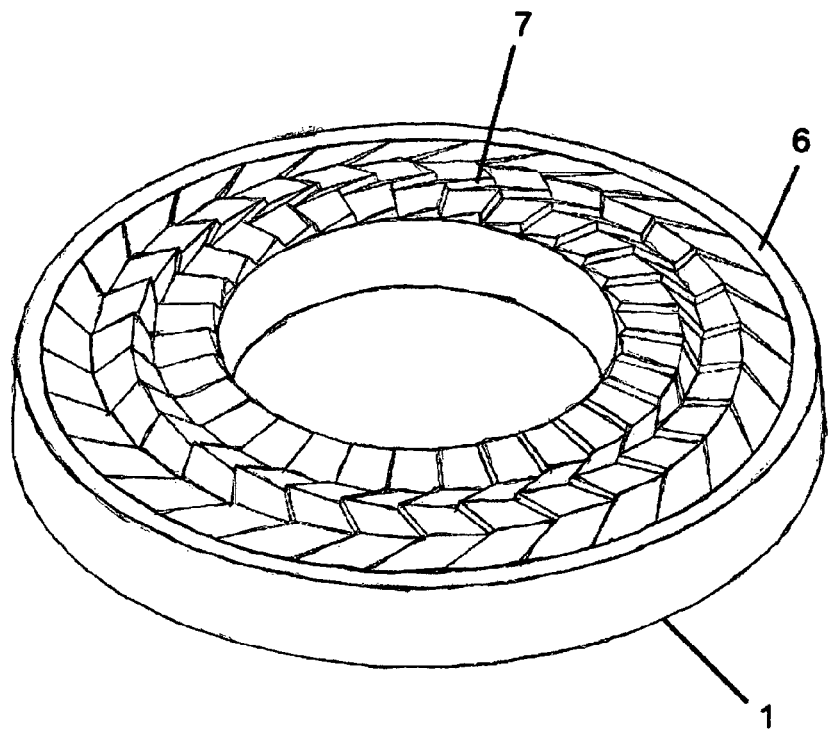

| | | | |
|---|---|---|---|
| 5,112,178 A | | 5/1992 | Overhues et al. |
| 2008/0014046 A1* | | 1/2008 | Bauer .................... F16B 43/00 411/164 |
| 2010/0209214 A1* | | 8/2010 | Andersson ............. F16B 39/24 470/42 |
| 2010/0260580 A1* | | 10/2010 | Andersson ............. F16B 39/24 411/534 |
| 2013/0170922 A1* | | 7/2013 | Persson ................... C25D 7/00 470/42 |
| 2014/0348609 A1* | | 11/2014 | Chen .................... F16B 39/282 411/209 |
| 2018/0023614 A1* | | 1/2018 | Andersson ............. F16B 43/00 411/545 |
| 2019/0003513 A1* | | 1/2019 | Junkers ............... B25B 23/1415 |
| 2019/0234447 A1* | | 8/2019 | Chang .................. F16B 39/282 |
| 2020/0400184 A1* | | 12/2020 | Davis ................... F16B 39/282 |

FOREIGN PATENT DOCUMENTS

| | | |
|---|---|---|
| EP | 3 296 578 A1 | 3/2018 |
| EP | 3 253 977 B1 | 12/2020 |
| GB | 2068494 A | 8/1981 |
| JP | 2009-144883 A | 7/2009 |

OTHER PUBLICATIONS

International Search Report in PCT/EP2021/054845, mailed May 6, 2021.

\* cited by examiner

CORROSION-RESISTANT SCREW-SECURING DISC

CROSS REFERENCE TO RELATED APPLICATIONS

This application is the National Stage of PCT/EP2021/054845 filed on Feb. 26, 2021, which claims priority under 35 U.S.C. § 119 of European Application No. 20165955.4 filed on Mar. 26, 2020, the disclosure of which is incorporated by reference. The international application under PCT article 21(2) was not published in English.

The invention relates to a corrosion-resistant screw-securing disk having a ring-shaped stainless-steel disk body for placement between a screw head and a flat support.

Screw-securing disks have the task of counteracting loosening processes in the case of screw connections. Such loosening processes result from losses in preload force in the screw connections, which occur as the result of settling processes and/or creep processes in the case of the parts that are screwed together.

In order to counteract such loosening processes, screw-securing disks have a spring effect, the spring force of which is dimensioned in such a manner that it can balance out a loss in preload force brought about by the settling processes and/or creep processes, to such an extent that the clamping force required for operational reliability of the screw connection is maintained.

In the case of great demands on corrosion protection, in particular also in the foods sector, screw connections made of stainless steel are used. The screw-securing elements are also produced from stainless steel in the case of connections using stainless-steel screws. Aside from the good corrosion protection properties of stainless steel, contact corrosion is prevented by means of the same galvanic potential of the screw-securing elements.

Fundamentally, stainless steel has only slight spring effects. In the case of special stainless-steel alloys, an increased spring effect can be implemented by means of a heat-treatment process. These special stainless-steel alloys as well as the heat-treatment process are very expensive, for one thing, and for another thing the corrosion properties are negatively influenced by the heat-treatment process. Last but not least, the spring properties achieved as an end result are generally not sufficient to meet the requirements. Against this background, heat-treated stainless-steel materials are only rarely used in practice for screw-securing elements.

Stainless steel having the material number 1.4301 or 1.4401 according to DIN EN 10027-2:2015-07 (X5CrNi18-10 and X5CrNiMO 17-12-2, respectively) is frequently used as a spring stainless steel having good or very good corrosion properties. In the case of this stainless steel, compaction of the surface is brought about by means of strain hardening when rolling the strip. This compaction leads to a limited spring effect in the case of thin sheet-metal thicknesses up to 1 mm, wherein the spring effect increases with a decreasing sheet-metal thickness. It is remarkable for this material that it has only a very restricted spring effect at greater thicknesses when it is strain-hardened, which effect is not sufficient to balance out seating in the case of screw connections. After strain hardening, this material can be processed further or reshaped only to a limited extent.

This is where the invention takes its start. The invention is based on the task of making available a corrosion-resistant screw-securing disk having a stainless-steel disk body, which disk can be used even in the case of great demands on corrosion protection, for example in the foods sector, has a high spring effect, and can be produced cost-advantageously. According to the invention, this task is accomplished by means of a screw-securing disk having the characteristics of the characterizing part of claim 1.

With the invention, a corrosion-resistant screw-securing disk having a stainless-steel disk body is made available, which can be used even in the case of great demands on corrosion protection, for example in the foods sector, has a high spring effect, and can be produced cost-advantageously. Because of the fact that the surfaces of the disk upper side and the disk underside of the disk body are compacted by means of a stamping process, wherein the disk body has a material thickness of at least 1.5 mm and wherein the disk body has a convex shape, a high spring effect is achieved to compensate setting effects, in order to maintain the preload force of a screw connection. The material thickness, which must be dimensioned to be sufficiently great, in combination with the compaction of the edge layer in the reshaped state and the surface tension that occurs during bracing, leads to the desired spring effect. In this regard, it was surprisingly found that the spring effect increases with an increasing material thickness. Preferably the screw-securing disk is configured in one piece. Preferably the disk body has a material thickness of at least 2 mm, particularly of at least 2.5 mm, in particular of at least 3.0 mm.

In a further development of the invention, at least one of the surfaces of the upper side and underside of the disk body is provided with knurling. In this regard, line contours are stamped into the surface, thereby achieving point-like additional compaction of the surface. In this way, the surface tension of the screw-securing disk and thereby the spring effect that occurs is adjustable. Preferably both surfaces of the upper side and the underside of the disk body of the screw-securing disk are provided with knurling. In this regard, the two surfaces can be provided with different knurling with regard to the knurling depth and/or knurling pattern, one from the other, and thereby the spring effect can be maximized.

In an embodiment of the invention, the stainless-steel disk body is produced from stainless steel having the material number 1.4401 or 1.4301 according to DIN EN 10027-2: 2015-7. These are cost-advantageous materials that demonstrate excellent corrosion properties. By means of the use of such a commercially available and formable starting material, stamping the knurling is easily possible, and good compaction of the surface of the screw-securing disk is achieved. The compaction of the soft starting material is combined, in the process, with shaping by means of compaction of the surface and point-like additional compaction in the form of knurling on one or both sides of the screw-securing disk by means of a stamping process.

In a further embodiment of the invention, an outer and an inner ring-section surface are arranged on the underside of the screw-securing disk, which faces the support, at an angle relative to one another, wherein the outer edge of the outer ring-section surface lies on the support in the non-braced state of the disk, and wherein the two ring-section surfaces enclose an acute angle with the support, in each instance, and wherein the angle α formed between the outer ring-section surface and the support is greater than the angle β formed between the inner ring-section surface and the support. As a result, the setting force acts at a steeper angle relative to the flat support, i.e. the force component in the vertical direction is greater than the force component in the horizontal direction. As a result, the outer edge of the surface of the outer ring section is pressed into the flat support more strongly when the screw is tightened, and thereby an improved securing effect is achieved. Furthermore the outside diameter of the disk can be kept relatively small while obtaining a high securing effect.

In a further development of the invention, the acute angle between the outer ring-section surface and the support amounts to between 10° and 20°, preferably between 12° and 15° in the non-braced state. These values yield good spring properties and securing properties of the disk. Preferably the acute angle between the inner ring-section surface and the support amounts to between 3° and 15°, preferably between 5° and 10° in the non-braced state.

It is advantageous if the angle γ between the two ring-section surfaces is an obtuse angle. Preferably the acute angle β between the inner ring-section surface and the flat support is about half as great in the non-braced state as the acute angle α between the outer ring-section surface and the flat support.

In a further embodiment of the invention, the surface of at least one contact surface, preferably of both contact surfaces is structured to be polished. In this way, the very good corrosion resistance of the stainless-steel material of the screw-securing disk, which is already very good, is additionally increased.

Figure 2:
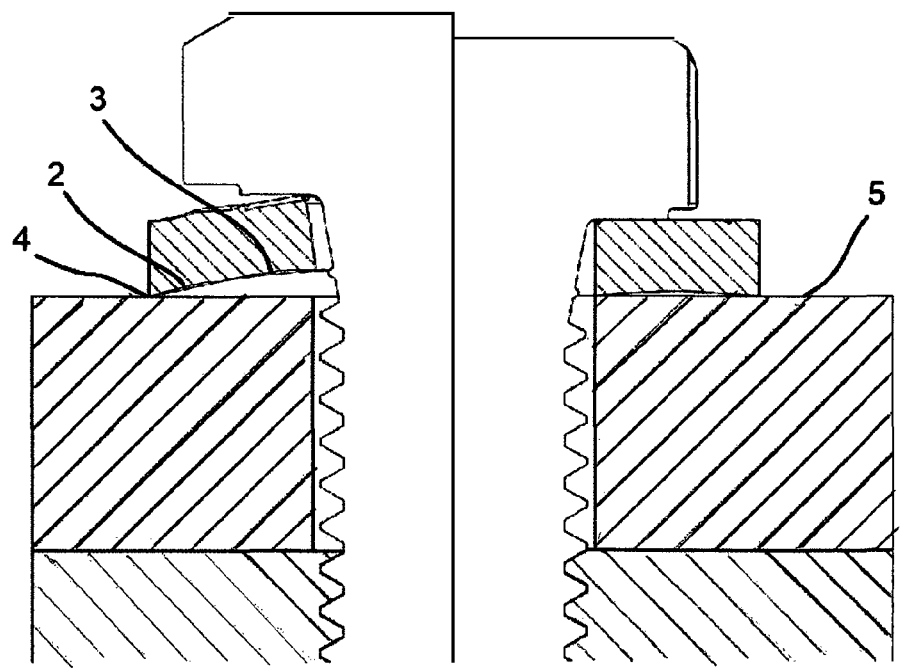
Figure 3:
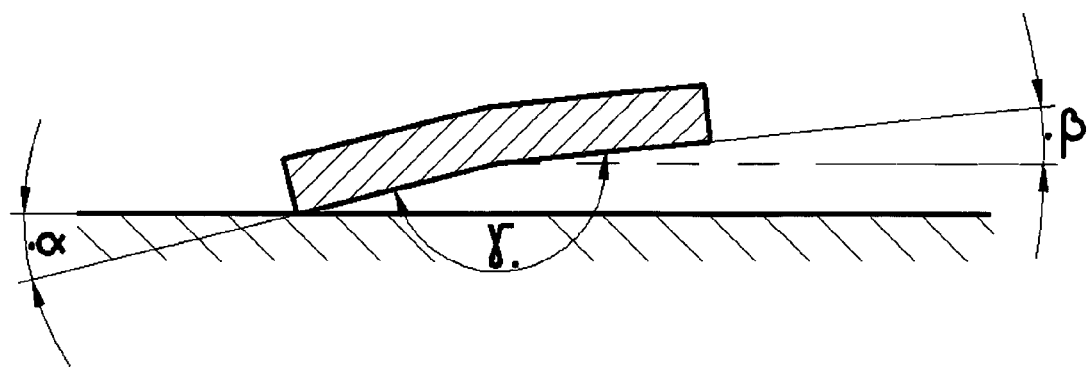

Other further developments and embodiments of the invention are indicated in the other dependent claims. An exemplary embodiment of the invention is shown in the drawings and will be described in detail below. The figures show:

FIG. 1 the schematic representation of a stainless-steel screw-securing disk;

FIG. 2 the schematic sectional representation, cut in half, of the screw-securing disk from FIG. 1, and FIG. 3 the schematic representation of a stainless-steel screw connection with a securing disk according to FIG. 1, wherein the left side of the figure shows the securing disk on the non-braced state, and the right side of the figure shows the securing disk in the braced state.

The screw-securing disk selected as an exemplary embodiment is produced from V4A stainless steel having the material number 1.4401 (X5CrNiMo 17-12-2) and comprises a convex disk body formed in ring shape, having a material thickness of 2.5 mm. The screw-securing disk has a disk upper side 6 and a disk underside 1, the surfaces of which are compacted by means of a stamping process, in each instance.

The disk underside 1 is configured to be convex and is divided into two ring-section surfaces 2, 3, an outer ring-section surface 2 and an inner ring-section surface 3, which are set at an angle relative to one another.

The screw-securing disk is structured in such a manner that in the non-braced state it lies on a flat support 5 with the outer edge 4 of its outer ring-section surface 2. In this regard, the outer ring-section surface 2 encloses an angle α with a flat support 5 in the non-braced state, and the inner ring-section surface 3 encloses an angle β with the flat support 5 in the non-braced state (see FIG. 3). In this regard, the angles α, β are configured as acute angles, wherein the angle β always has a smaller value than the angle α. In the exemplary embodiment, the angle α amounts to 14° and the angle β amounts to 6°.

On its upper side 6, which faces away from the support 5, the screw-securing disk is configured to be domed. A knurling 7 is circumferentially introduced into the surface of the upper side 6 within the frame of the stamping process, and thereby additional compaction is achieved. In the exemplary embodiment, the knurling 7 is structured by means of an arrangement of continuous lines (see FIG. 1). Depending on the desired partial compaction of the surface, other knurling patterns can also be introduced. In the exemplary embodiment, both the upper side 6 and the underside 1 are provided with a knurling 7. To increase the corrosion resistance, the surfaces of the upper side 6 and the underside 1 are polished.

The invention claimed is:

1. A corrosion-resistant screw-securing disk having a ring-shaped stainless-steel disk body for placement between a screw head and a flat support (5), having a disk upper side (6) and a disk underside (1) facing the support, wherein the surfaces of the disk upper side (6) and the disk underside (1) of the disk body are compacted by means of a stamping process to achieve a high spring effect, wherein the disk body has a material thickness of at least 1.5 mm and has a convex shape.

2. The screw-securing disk according to claim 1, wherein the disk body has a material thickness of at least 2.0 mm, preferably at least 2.5 mm.

3. The screw-securing disk according to claim 1, wherein at least one of the surfaces, preferably both surfaces of the upper side and underside (6, 1) of the disk body is provided with knurling (7).

4. The screw-securing disk according to claim 3, wherein both surfaces of upper side and underside (6, 1) of the disk body are provided with different knurling (7) with regard to knurling depth and/or knurling pattern, one from the other.

5. The screw-securing disk according to claim 1, wherein the stainless-steel disk body is produced from stainless steel having the material number 1.4401 or 1.4301 according to DIN EN 10027-2:2015-07.

6. The screw-securing disk according to claim 1, wherein an outer and an inner ring-section surface (2, 3) are arranged on its underside (6), which faces the support (5), at an angle relative to one another, wherein the outer edge of the outer ring-section surface (2) lies on the support (5) in the non-braced state of the disk, and wherein the two ring-section surfaces (2, 3) enclose an acute angle with the support (5), in each instance.

7. The screw-securing disk according to claim 6, wherein the angle γ between the two ring-section surfaces (2, 3), facing the flat support (5), is an obtuse angle.

8. The screw-securing disk according to claim 6, wherein the angle α formed between the outer ring-section surface (2) and the support (5) is greater than the angle β formed between the inner ring-section surface (3) and the support (5).

9. The screw-securing disk according to claim 8,
wherein the acute angle α between the outer ring-section surface (2) and the support (5) amounts to between 10° and 20° in the non-braced state, and
wherein the acute angle β between the inner ring-section surface (3) and the support (5) amounts to between 3° and 15° in the non-braced state.

10. The screw-securing disk according to claim 9, wherein the acute angle α between the outer ring-section surface (2) and the support (5) amounts to between 12° and 15° in the non-braced state, and wherein the acute angle β between the inner ring-section surface (3) and the support (5) amounts to between 5° and 10° in the non-braced state.

11. The screw-securing disk according to claim 8, wherein the acute angle β between the inner ring-section surface (3) and the flat support (5) is about half as great in the non-braced state as the acute angle α between the outer ring-section surface (2) and the flat support (5).

12. The screw-securing disk according to claim 1, wherein at least one of the surfaces of upper side and underside (6, 1) of the disk body is polished.

13. The screw-securing disk according to claim 1, wherein the disk body has a material thickness of at least 2.5 mm.

* * * * *

UNITED STATES PATENT AND TRADEMARK OFFICE
CERTIFICATE OF CORRECTION

| | | |
|---|---|---|
| PATENT NO. | : 12,025,173 B2 | |
| APPLICATION NO. | : 17/616732 | |
| DATED | : July 2, 2024 | |
| INVENTOR(S) | : Thomas Volborth | |

It is certified that error appears in the above-identified patent and that said Letters Patent is hereby corrected as shown below:

In the Claims

In Claim 2, Lines 2-3 (Column 4, Lines 20-21): after "2.0 mm" please delete ", preferably at least 2.5 mm"

Signed and Sealed this
Thirtieth Day of July, 2024

Katherine Kelly Vidal
*Director of the United States Patent and Trademark Office*